E. P. Beckwith.
Paper Cutting Mach.
No. 2,619. Reissued May 21, 1867.
Fig. 1.
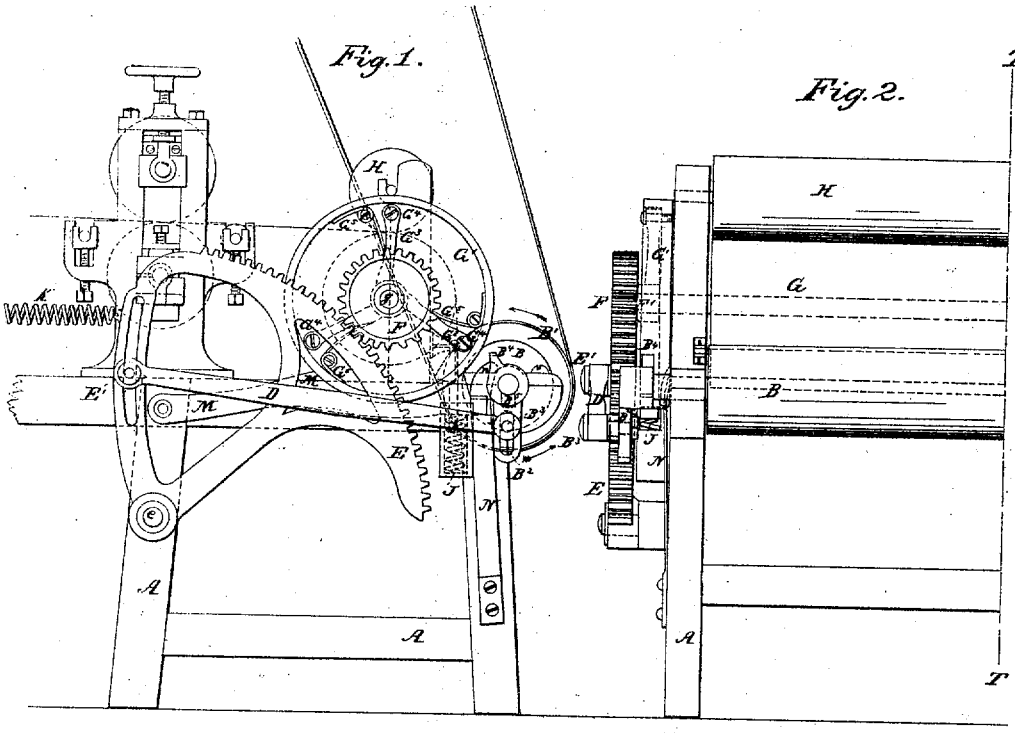
Fig. 2.
Fig. 3.
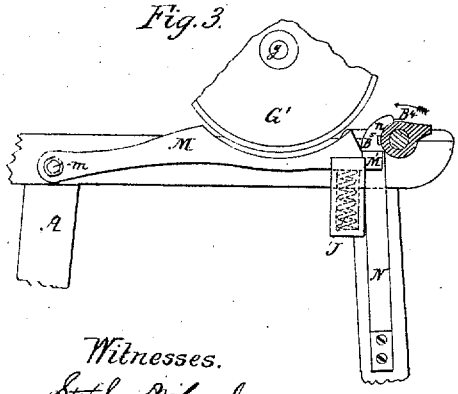
Fig. 4.
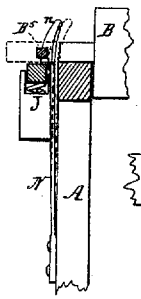
Fig. 5.
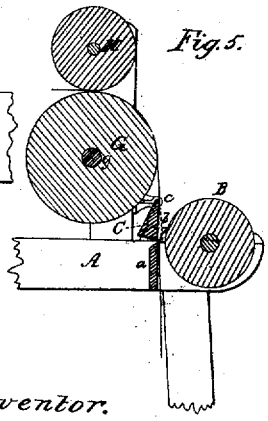
Witnesses.
Stephen Wilcox Jr.
D. H. Stetson
Inventor.
Wm. Smith, Executor.
per Thomas D. Stetson
Attorney.

UNITED STATES PATENT OFFICE.

WILLIAM SMITH, OF SOUTH WINDHAM, CONNECTICUT, EXECUTOR OF THE ESTATE OF ENOS P. BECKWITH.

PAPER-CUTTING MACHINE.

Specification forming part of Letters Patent No. 51,669, dated December 19, 1865; Reissue No. 2,619, dated May 21, 1867.

*To all whom it may concern:*

Be it known that ENOS P. BECKWITH, of South Windham, in the county of Windham, and State of Connecticut, since deceased, did invent certain new and useful improvements in Machines for Cutting Paper; and it is hereby declared that the following is a full and exact description thereof. The accompanying drawings form a part of this specification.

Figure 1 is a side view; and

Figure 2 is a front view, representing the principal portions of the machine.

Figure 3 represents some of the details which are nearly concealed in figs. 1 and 2; and Figures 4 and 5 are sections through some of the parts, fig. 4 being a view partially in section of a small portion in fig. 2, and fig. 5 being a section on the line T T in the same figure.

Similar letters of reference indicate like parts in all the figures.

This machine is adapted to receive the paper in a continuous sheet, either directly from the foudrinier or from a large roll, in which form it has been previously taken from the foudrinier and mounted on a suitable stand not represented. It cuts the paper into sheets of the desired size and deposits it in a pile. Any of the ordinary means may be employed for aiding in the delivery of the paper from the roll, and in the accurate piling, counting, etc., of the sheets.

To enable others skilled in the art to make and use this invention, the following detailed description is presented.

The letters of reference refer to the corresponding letters on the drawings.

A is a framing of wood. B is a drum mounted on a stout shaft, supported on the framing A, and carrying a knife, *b*. *a* is a fixed knife, supported on the framing A, in the position represented, so that at each revolution of the drum B the knife *b* cuts the paper by acting thereon between itself and the fixed knife *a*. This shaft B is rotated with a continuous and uniform movement by means of a stout belt acting on the pulley $B^1$, as represented in fig. 1. The paper is fed down to the point where it is acted on by the knives *b* and *a* with an intermittent motion, its motion being entirely suspended during the period while the knives are acting. The knives *b* and *a* may be set with any amount of "shear" which is necessary to perform the work smoothly and without strain. If the shear is great a considerable period must elapse while the cutting is being performed. The mechanism is so arranged that the paper is detained and held entirely stationary for a longer period than is ever required to complete the division of the paper. When the sheet of paper has been completely divided the part below falls, or is removed by mechanism not represented, to be folded in quires, or otherwise disposed of. It is important to prevent the front edge of the paper which remains above the knife *a* from catching or lodging on the knife *a*, and thus interfering with the proper motion of the paper when it is again fed forward. This is effected by the pendulous piece C, which is hung on the slight shaft *c* and inclines forward by its gravity. When the rotation of the shaft B brings the knife *b* into contact with the sheet of paper, it easily presses back the pendulous piece C into the position shown in strong lines in fig. 5, but the moment the paper is completely divided, and the knife *b* has passed entirely below the lower edge of the piece C, the latter swings forward by gravity into the position indicated by dotted lines. This movement throws the edge of the paper forward entirely clear of the knife *a*.

The mechanism by which the proper intermittent motion of the paper is obtained will now be described. $B^2$ is a slotted arm or crank on the overhanging end of the shaft B. A crank-pin, $B^3$, is firmly fixed thereon. A connection, D, leads from this crank-pin to a pin, $E^1$, which is fixed on the segment E adapted to vibrate on the centre *e*. The revolution of the shaft B communicates a regular reciprocating motion to the segment E, which gears into a wheel, F, which is fitted loosely on an overhanging end of a shaft, *g*. This shaft *g* carries a drum, G, between which and the drum H the paper is received and is held fast or fed forward, according as the drums G and H are operated. The large hollow wheel $G^1$ is, like the drum G, securely fixed on the shaft *g*. The gear-wheel F carries a short sleeve, F′, which projects into the interior of the hollow wheel $G^1$, as indicated. Friction-pawls $G^3$ mounted on centres $G^4$ are pressed by the springs $G^5$ into contact with the exterior of the sleeve F′, at such an angle that the friction between the ends of the pawls $G^3$ and the sleeve F′ will turn the wheel $G^1$ with its connected parts when the wheel F rotates in one direction, but will produce no effect when the said wheel rotates in the opposite direction. The action of this portion of the mechanism will now be readily understood. The drum H being pressed down upon the drum G by its gravity, or other sufficient force to properly hold the paper, the rotation of the crank $B^2$ gives a reciprocating motion to the segment E, and thus rotates the wheel F and the drum G in the proper direction to feed forward the paper to a proper extent, while the knife *b* is traveling idly around with the rotation of the drum B. Before the knife *b* strikes the paper the segment E commences to move in the opposite direction, and consequently to rotate the wheel F and sleeve F′ in the opposite direction. This movement produces no effect on the drum G, because the sleeve F′ is allowed to revolve idly in this backward direction without communicating any force to the friction-pawls $G^3$. The wheel $G^1$ and the connected parts, therefore, are allowed to remain at rest during the entire backward motion of the wheel F, or during one semi-revolution of the drum B. In order to insure that the drums G and H, and consequently the paper held between them, shall remain entirely motionless during this period, I provide a brake, M, adapted to turn on the bearing *m*, and to apply tightly against the under surface of the wheel $G^1$. It is pressed up to its work by a strong spring, J, which is cased within a suitable housing on the framing A, as indicated. This brake is allowed to rise by the force of this spring and to hold the wheel $G^1$ very firmly, while the segment E, and consequently the wheel F, commence their backward movement, or the movement which tends to carry the paper backward between the drums G and H. A little before the segment E and the connected parts commence the motion in the opposite direction so as to feed forward the paper, a projection, M′, on the extreme end of the brake M, is struck by a short arm, $B^4$, which is carried on the shaft B, and is pressed downward a considerable distance, so that the brake M is entirely clear of the wheel $G^1$. The brake M is held in this position by the spring-catch N, which is mounted on the side of the framing A, and is adapted to hook or catch over the projection M′ when the latter is in its lowest position. The upper end of the spring-catch N is marked *n*, and is bent considerably inward toward the drum B, as indicated in figs. 2 and 4. The shaft B turns freely around after shearing off the paper and depressing the lever M, without resistance from friction on the brake M, the latter being held down by the spring-catch N, entirely independent of any of the moving parts. This condition continues until near the period when the crank $B^2$ is again on its dead-point, and the forward motion of the drums G and H has consequently ceased. At this juncture the bent end *n* of the spring-catch N is touched by a spur or side-cam $B^5$, which is carried on the back side of the crank $B^2$, and the catch N is thus detached from its hold on the brake M, when the latter is immediately driven upward by the tension of the spring J, and firmly holds the wheel $G^1$ and the connected mechanism until it is again pressed downward and again confined, as before described. K is a coiled spring of considerable length connected to any convenient portion of the stand from which the paper is delivered. It tends to pull the segment E continually to the left, as seen in fig. 1, and thus tends to balance the gravity of the segment E, and also to aid the mechanism in its slight labor of pulling the paper forward.

This machine possesses very marked advantages over those before used for this purpose. Some of these may be specifically enumerated as follows:

First. The fact that the stopping and starting is done with a reliable motion, by gradual increments, or a gradual stopping and gradual starting, in lieu of the sudden and violent changes incident to the use of former machines having intermittent motions, avoids the noise and the strain on the parts due to a violent starting and stopping, and avoids the risk, hitherto serious, of a slipping of the paper and inducing irregularities in the size of the sheets by the feed-rolls commencing to move before the sheet starts; while the frictional connection transmits the forward motion to the feeding-drums G and H with sufficient power, and with great certainty and very quietly, and allows the length of the paper cut off at each passage of the knife *b* to be varied by as small amounts as may be required, which could not be done with pawls operating on teeth, or by any other ordinary device for the purpose.

Second. The fact that, in addition to the above-recited advantages due to the gradual starting, the cutting is effected by a revolving knife, in lieu of a reciprocating one, brings the cutting edges in contact but once, instead of twice, for each cut, and consequently keeps them longer in condition for use, and the combined mechanism operates more rapidly and with less vibration and strain.

Third. The fact that the continuous rotation of the shaft B communicates motion through the crank $B^2$, pin $B^3$, and connection D, to the segment E, gives a reciprocating rotary motion to the feeding-drum G and its connections with very simple mechanism.

Fourth. The fact that the link D, connected and operated as described, is mounted as specified on the pins $B^3$ and E′, adjustable in slots as described, gives a facility for adjusting said pins so that the length of the sheets of paper can be varied at will within wide limits, without interfering with the perfection of the movement or the accuracy with which the length is measured.

Fifth. The gravity knock-off, or pendulous piece C, yields very readily to a gentle force impressed by the knife *b*, yet throws the paper forward with great certainty so soon as the knife has passed.

Sixth. The spring K aids the forward motion of the reciprocating feed G H, using for the purpose the power which it has accumulated during the period while the paper is stationary.

Seventh. The brake M allows the feed-rolls to turn without obstruction till at or near the close of the period of motion, and then, by taking hold, prevents the partial return of the feed-rolls, which might otherwise occur.

Eighth. The brake M, in addition to its important function of preventing the partial recoil, also destroys the forward motion of the feeding parts G with great gentleness and firmness, and holds the parts in any position in which they may be stopped in feeding the paper to form sheets of the various lengths.

Ninth. The spring J urges the brake M to its work with great promptness, and holds it with sufficient firmness, even though the wear of the rubbing parts may induce a considerable variation in the positions in which it comes to rest at different periods.

Tenth. The catch N holds the brake M open without entailing any friction or wear on the machine, and by the filing or otherwise adjusting of the edge by which it holds on M′, may allow the liberation of the brake M with great promptness at any desired point.

Eleventh. The detaching-cam $B^5$ and bent top or inclined surface *n*, opening together as specified, detach the dog N with certainty at the proper period without complex mechanism.

Having now fully described this invention, what I claim as new, and as the invention of the said BECKWITH, is as follows:

1. The employment in a paper-cutting machine of a combination of two elements, to wit, a feed mechanism impelled by a motion intermittent which starts and stops the feed gradually, and a frictional connection, which connection allows a returning motion of the impelling mechanism while the feed is at rest, and takes hold of and releases the feed at any point, without the lost motion due to ratchets and the like toothed connections, all substantially as and for the purpose herein specified.

2. The combination in a paper-cutting machine of a revolving knife, with a gradually starting intermittent feed mechanism, substantially as and for the purpose herein set forth.

3. The within-described arrangement of the revolving knife *b*, crank $B^2$, link D, connecting means E, and intermittent feeding-drum G, substantially as and for the purpose specified.

4. In combination with mechanism, substantially as herein described, for feeding forward and arresting the motion of the paper, I claim adjusting the length of the sheets by changing the position of the link D, or its equivalent, substantially as and for the purpose herein set forth.

5. The pendulous piece C, arranged relatively to the knives *a* and *b*, and to the gradually stopping and starting mechanism G H, or its equivalent in a paper-cutting machine, substantially as and for the purpose herein specified.

6. The spring K, arranged as specified, relatively to the intermittent feeding mechanism E F G and their connections in a paper-cutting machine.

7. Taking hold of the feed-roller so as to prevent its recoiling backward when the forward motion is arrested, in combination with the feed, having an alternated reversed motion and gradually starting and stopping, as herein specified.

8. The within-described construction and arrangement of the brake M so as to aid in arresting the forward motion at the proper time, as well as to prevent the backward motion.

9. The within-described arrangement of the spring J, brake M, wheel $G^1$, and the connected parts of an intermittent feed in a paper-cutting machine, substantially as specified.

10. The catch or dog N, with a releasing device therefor, in combination with the brake M, spring J, and suitable means for depressing the same, and the intermittent feeding-drums G H, or their equivalents, in a paper-cutting machine, as specified.

11. The detaching cam $B^5$ and surface *n*, arranged relatively to the cutting-shaft B, catch N, brake M, and wheel $G^1$, of an intermittent feed in a paper-cutting machine, substantially as specified.

WILLIAM SMITH.

Witnesses:
JOHN M. ALPAUGH,
ALLEN LINCOLN.